United States Patent [19]

Sandesara

[11] 4,118,243

[45] Oct. 3, 1978

[54] PROCESS FOR DISPOSAL OF ARSENIC SALTS

[75] Inventor: Mahendra D. Sandesara, South Holland, Ill.

[73] Assignee: Waste Management of Illinois, Inc., Palos Heights, Ill.

[21] Appl. No.: 830,237

[22] Filed: Sep. 2, 1977

[51] Int. Cl.$^2$ ............................................. C04B 11/10
[52] U.S. Cl. ...................................... 106/109; 210/50; 423/87
[58] Field of Search ................... 423/87, 140, DIG. 1, 423/DIG. 2; 210/42 R, 52, 51, 50; 106/85, 109, 110

[56] References Cited

U.S. PATENT DOCUMENTS

| | | | |
|---|---|---|---|
| 1,672,584 | 6/1928 | Travers | 210/52 |
| 2,165,344 | 7/1939 | Colton | 106/109 |
| 2,240,254 | 4/1941 | Colton | 106/109 |
| 2,316,039 | 4/1943 | Wilson | 106/109 |
| 3,855,391 | 12/1974 | Selmeczi et al. | 106/110 |
| 4,049,462 | 9/1977 | Cocozza | 106/109 |

FOREIGN PATENT DOCUMENTS

2,342,729   1/1975   Fed. Rep. of Germany ............. 423/87

OTHER PUBLICATIONS

Boynton, *Chemistry and Technology of Lime and Limestone*, Interscience, N.Y., (1966), [TP886B68], pp. 267, 268, 362–364, 368–373.

*Primary Examiner*—Brian Hearn
*Attorney, Agent, or Firm*—Sughrue, Rothwell, Mion, Zinn and Macpeak

[57] ABSTRACT

Arsenic-containing waste materials comprising water-soluble arsenic salts are processed to a product which comprises water-insoluble arsenic salts by reacting the same in an aqueous system with sulfuric acid and calcium hydroxide in the presence of sulfate ions and ferrous and/or ferric ions, and thereafter curing the system to solid form.

The process can be practiced with conventional waste materials without preliminary special processing, and provides a product which can be easily handled and is amenable to secure landfill disposal.

20 Claims, No Drawings

PROCESS FOR DISPOSAL OF ARSENIC SALTS

BACKGROUND OF THE INVENTION

1. Field of the Invention

The present invention relates to processes for the conversion and safe disposal of waste materials containing soluble arsenic salts.

2. Description of the Prior Art

Many companies in the United States use arsenical materials in various products and processes, and it is important to have available a disposal capability for the by-products or wastes thus generated which will not degenerate the natural environment.

Since arsenic is an element and cannot be destroyed, the best procedure for treating arsenical waste materials is to detoxify the same by changing their chemical structure to a non-soluble state, which is well suited to secure landfill disposal. The process of the present invention accomplishes that goal.

Present process for treating arsenical materials are extremely sophisticated, generally comprising two or three different process stages. They are also extremely costly and are generally designed to be point source specific—that is, they are designed to treat a specific waste material under rigid parameters.

The process of the present invention permits a great deal of latitude in process parameters and permits the process of detoxification to be completed in a single step operation.

The process of the present invention is unique as compared to prior art processes, and is much more cost effective because it utilizes a very simple equipment package and, most importantly, in a highly preferred embodiment, it utilizes three waste products which, in effect, have no commercial value and, therefore, almost eliminates the cost of process chemicals to provide an end product that is well suited environmentally for secure landfill disposal.

The process of the present invention is also superior to prior art processes because it directly addresses treatment of arsenical waste for purposes of detoxification prior to disposal, and the simplicity of the equipment involved and the availability of the component waste required for the process makes it readily duplicatable in substantially all areas of the United States.

U.S. Pat. No. 3,911,078, Nadkarni, et al. discloses a method for removing arsenic and antimony from copper ore concentrates. In the described process, arsenic, along with any antimony present, is removed from copper ore concentrates by leaching the ore with an aqueous solution of sodium sulfide containing sodium hydroxide. Copper sulfide, which remains undissolved and in the form of particles, is removed by filtering to leave a pregnant solution containing dissolved sodium thioarsenate and sodium thioantimonate, which are then converted to the sulfides or to ferric arsenate and ferric antimonate by any of several reaction routes—e.g., acidification with a strong mineral acid, such as sulfuric acid, to produce arsenic sulfide which is, in turn, converted to ferric arsenate by acid pressure leaching, partial neutralization by lime and the addition of ferric sulfate.

The process described in Nadkarni, et al. is extremely complicated, requires multiple steps and is directed to the specialized art of treating copper ore concentrates.

U.S. Pat. No. 3,107,977, Borvali, et al., relates to a process for treating arseniureted ores, particularly of cobalt and/or nickel. The process comprises placing the arseniureted ores in suspension in sulfuric acid and progressively adding nitric acid to oxidize the arsenic present. Excess sulfuric acid is utilized to transform most of the metals present into sulfates, and addition of nitric acid is controlled to promote a limited oxidation of the arsenides in the ore. A limited oxidation prepares the system for the subsequent separation, in the form of $As_2O_3$, of any excess arsenic present which is not necessary to maintain a weight ratio of iron to arsenic near one, and which excess thus will not be necessary in the subsequent formation of ferric arsenate. Following a complicated series of crystallizations, dissolutions, filtrations and chlorine treatments, calcium carbonate is finally added to precipitate arsenic and iron as ferric arsenate using a 1:1 weight ratio between arsenic and iron.

Borvali, et al. is similar to Nadkarni, et al. in the sense of involving an extremely complicated processing sequence and in relating to the treatment of ores per se.

U.S. Pat. No. 1,509,688, Parsons, et al., relates to a method of recovering arsenic from oxidized metallurgical dusts or fumes, wherein the dusts or fumes are leached with hot water and, in certain instances, with a caustic soda solution of sufficient alkalinity to correspond to about a disodium compound of the arsenic to be extracted, thereby yielding a substantially neutral extract.

U.S. Pat. No. 1,952,290, Schopper, discloses a process for recovering arsenic, in the form of arsenious acid, from arseniferous metallurigal intermediate products and by-products. According to the described process, arsenic in the metallurgical intermediate products and byproducts is separated in the form of arsenic trioxide by first converting the arsenic present into arsenic acid, for example, by roasting, dissolving the arsenic acid by extracting the roasted product with a suitable acid and thereafter reducing the same to arsenic trioxide by treatment with a reducing agent. Suitable acids include sulfuric acid, and, when arsenic is initially present in the pentavalent form, leaching with an acid such as sulfuric acid can be effect without any previous oxidation treatment.

U.S. Pat. No. 863,940, Baschen, et al., discloses a process for purifying arsenical sulfuric acid to obtain arsenic therefrom in the form of liquid arsenious chloride which comprises contacting the arsenical sulfuric acid with hydrochloric acid gas at an elevated temperature.

U.S. Pat. No. 3,684,492, Colombini, et al., describe a process for preparing arsenic-free copper cement from arsenical acid solutions obtained by chlorinating roasting or by chlorinating volatilization of iron minerals (pyrite ashes) which consists of:

Mixing the starting solution with ferrous salt;

Bringing the resulting solution to a pH between 3 and 3.5 at a temperature between 20° and 80° C. using a neutralizer, followed by filtering to obtain a filtrate; and Cementing the filtrate with excess metal iron at 20°–40° C. to obtain copper cement free of arsenic and a discharge solution free of arsenic.

Arsenic is precipated in the form of Fe arsenite in the above process.

U.S. Pat. No. 3,687,628, Nelen, et al., discloses a process for purifying sulfur from arsenic wherein molten sulfur is contacted with calcium oxide or calcium hydroxide in the presence of an aqueous solution of inorganic salts whose boiling point is higher than the melting point of sulfur and whose anions form soluble compounds with calcium cations.

U.S. Pat. No. 3,969,202, Albrethsen, et al., disclose a process for recovering antimony values from ores containing sulfo-antimony compounds of copper and arsenic which comprises:

Smelting a charge of the above material (ore or ore concentrate) in combination with calcium values, a sodium salt and a reducing agent to convert arsenic to a water-insoluble calcium compound of arsenic and oxygen;

Leaching an alkaline matte obtained from the smelting with an aqueous liquid; and Separating the aqueous liquid leach solution containing the desired materials from an insoluble solid leach residue containing the insoluble calcium compound of arsenic and oxygen.

SUMMARY OF THE INVENTION

One object of the present invention is to provide a process for converting waste material containing soluble arsenic salts to a material containing insoluble arsenic salts which is amenable to secure landfill disposal.

Another object of the present invention is to provide a process as in the preceding paragraph wherein the product is easily handled.

A further object of the present invention is to provide a process as described which, if desired, can directly utilize reactant materials all of which are industrial waste materials.

Yet a further object of the present invention is to provide a process as described which requires a minimum of apparatus and can be practiced as a simple process.

Still yet a further object of the present invention is to provide a process for detoxification of solid and/or liquid arsenic-containing waste materials which provide a product of long-term insolubility over an extended pH range—i.e., which can be disposed of in a landfill area which has a pH of about 4.0 to about 10.5.

The process of the present invention comprises reacting in an aqueous system an arsenic-containing waste material which contains water-soluble arsenic salts, a source of sulfuric acid, such as spent sulfuric acid pickling liquor and a source of calcium hydroxide, such as bag house lime, in the presence of ferrous ions, typically all reactants being industrial waste materials, thereby converting water-soluble arsenic salts to water-insoluble arsenic salts, and thereafter curing the system to provide a solid product.

The resulting product is solid, easily handled, and subject to secure landfill disposal in a conventional manner.

DETAILED DESCRIPTION OF THE INVENTION

The disposal of water-soluble arsenic salt-containing waste materials has, to date, proven a substantial problem in the art.

While processes are available for disposing of arsenic-containing waste materials, universally such processes are very complicated, or require expensive apparatus or expensive reactant materials, or a combination of a plurality of these factors.

The present invention provides a process for the disposal of arsenic-containing waste materials which, in its most preferred form, utilizes only various industrial waste materials, and yet provides an end product which contains substantially completely water-insoluble arsenic salts, and which is amenable to secure landfill disposal.

Highly preferred reactants in the process of the present invention are the water-soluble arsenic salt-containing waste material which is to be detoxified, a spent sulfuric acid pickling liquor containing ferrous sulfate, and bag house lime, all of which are waste products from various industries.

The Arsenic-Containing Waste Material Treated

Arsenical-containing waste materials are generated in a number of industries in the United States. One major area of generation of arsenical waste materials is the herbicide/pesticide industry where arsenic-bearing products are manufactured to control annual weeds and grasses and insects, such as the boll weevil in the cotton industry. A second major source of arsenical-bearing waste materials is the pharmaceutical industry where feed additives are manufactured to control heartworm and other parasites, primarily in hogs and household pets. Third, a relatively smaller source of arsenical-bearing waste materials is the munitions industry where arsenic is used as an alloying material in the manufacture of ammunition shells. Finally, various arsenical-bearing waste materials are generated in the specialty chemical industry, as will be obvious to those skilled in the art.

The primary criterion which the arsenic-containing waste material of the present invention exhibits is that it contains water-soluble arsenic salts. On a practical commercial scale, this will mean that the arsenic salts are completely soluble in water at temperatures in excess of 1° C.; since operation at temperatures as low at 1° C. will seldom be encountered in accordance with the present invention, it can generally be said that any arsenic salt which illustrates substantially complete water solubility at the temperature of operation of the present invention can be subjected to processing therein.

The proportion of the water-soluble arsenic salts in the waste material is not limited in any special fashion, and the process of the present invention is applicable to the detoxification of arsenic-containing waste materials having a low water-soluble arsenic salt concentration, for example, on the order of about 1% or less, and to such waste materials having a relatively high water-soluble arsenic salt concentration, for example, on the order of about 10%, by weight, or higher.

Since on a commercial scale arsenic-containing waste materials will seldom contain much more than about 10%, by weight, water-soluble arsenic salts, for practical purposes, the present invention will be discussed in the above context, it being noted that the process of the present invention finds particular application in the treatment of arsenic-containing waste materials which contain soluble arsenical salts in an amount of from about 6,000–14,000 ppm, though greatly higher arsenical salt concentrations up to and including pure arsenical salts can be treated merely by adjusting the flow ratios of arsenical salt to spent sulfuric acid pickling liquor while keeping the iron content of the spent sulfuric acid within the parameters later specified.

Turning briefly to the identity of the water-soluble arsenic salts present in the waste material, the exact identity thereof is not overly important. Rather, the important criterion is that the water-soluble arsenic salts present be capable of being converted to the water-insoluble form upon reaction with the active constituents of the spent sulfuric acid pickling liquor and the bag house lime reactants.

For purposes of the present invention, a certain typical arsenic-containing waste material can be illustrated as containing the water-soluble arsenic salts monosodium methane arsenate, cacodylic acid and sodium arsenite. These materials are commonly encountered as a waste by-product in the manufacture of herbicidal compositions and undergo reactions representative of water-soluble arsenic salts in general which comprise a non-toxic cationic portion and an anionic portion (derived from arsenic per se).

The present invention is not limited to the above exemplary water-soluble arsenic salts, and examples of other soluble arsenic salts processable in accordance with the present invention include calcium arsenate, calcium arsenide, and magnesium arsenate.

One primary identifying characteristic of arsenic-containing waste materials is that they contain amounts of soluble arsenic salts (occasionally in combination with insoluble arsenic salts) in an amount which renders it economically unfeasible to recover the arsenic, but in an amount which renders them environmentally hazardous if not detoxified prior to disposal.

Commonly, as produced from an herbicidal process, such arsenic-containing waste materials will contain substantial proportions of relatively harmless salts of various metals, such as chloride and sulfide salts, zero to substantial proportions of moisture due to the inherent nature of the manufacturing process and various other components, depending upon the by-products of the manufacturing process.

Not to be construed as limitative, the following is a typical arsenic-containing waste product which can be treated in accordance with the present invention as results from the manufacture of herbicidal products (unless otherwise indicated, all percentages hereafter are by weight):
1-5% monosodium methane arsenate
1-5% cacodylic acid
1-5% sodium arsenite
5-80% inorganic chloride and sulfate salts, typically sodium chloride and sodium sulfate
0-100% moisture.

Non-arsenical constituents of the waste product treated in accordance with the present invention are not critical to the reaction. However, as can be appreciated, if substantially high amounts of the same are present, this could effect the ratios of the spent sulfuric acid pickling liquor and/or the lime required.

The general rule is, however, that even if such nonarsenical constituents are present, they will not effect the parameters of the process of the present invention to an extent that one is forced to operate outside of the process parameters later delineated, and the general rule is that other constituents be they solid or semi-solid, will have no substantial effect on the reaction kinetics of the process of the present invention. For example, assuming sodium chloride is present, the same could be solid or liquid with no effect on the reaction of the present invention. In the case where sodium chloride is present in the liquid state, it is highly probable that the soluble arsenic salts would also be in the liquid state, and neither constituent would react differently in the process of the present invention as compared to the situation if it were in the solid state.

The Spent Sulfuric Acid Pickling Liquor

For purposes of brevity, the above component will hereafter often be referred to as a spent pickling liquor or merely a pickling liquor.

A unique advantage of the present invention is that one primary reactant can be a waste product from common industrial processing —that is, a spent sulfuric acid pickling liquor as is conventionally encountered as a by-product from normal steel mill operations.

The identity of the spent pickling liquor is not unduly limited so long as certain essential constituents are present as later defined, and, of course, the spent pickling liquor is free of materials which would unduly interfere with the reaction of the present invention. As will be appreciated by one skilled in the art, a pickling liquor is typically used in the steel industry for cleaning and descaling steel; accordingly, while the constituents of any particular spent sulfuric acid pickling liquor may somewhat vary in acid strength depending upon the specifications for the product surface desired in the steel processing, so long as the acid component and ferrous ions are present, the spent sulfuric acid pickling liquor is useful in the process of the present invention.

The essential constituents which must be present in the spent pickling liquor are:
Sulfuric acid;
Ferrous ions to insure proper setting of the reaction system to solid form and sufficient iron in solution (either in ferrous and/or ferric form) to react with arsenic derived from the water-soluble arsenic salts present.*

*Note: Although ferric sulfate can be used as a substitute in the reaction, ferric sulfate will not cause the end product to "set-up" as will ferrous sulfate. Therefore, in regard to the scope of the invention, we will refer strictly to the ferrous state of iron in that it is most desirable in relation to the physical state of the end product.

The amount of the sulfuric acid should be on the order of about 8 to about 20%, preferably 8–12%, based on the total weight of the spent sulfuric acid pickling liquor. It is to be noted, in this regard, that pH is not an essential factor in the present invention; rather, the amount of sulfuric acid present is an essential factor.

Ferrous ions should be present in an amount which corresponds to at least about 0.5%, preferably at least 1%, iron (Fe), based on the weight of the spent pickling liquor. In addition to the ferrous ions necessary to insure proper setting of the "pug," sufficient free iron (FeII and/or FeIII) should be present to insure reaction with water-soluble arsenic present—i.e., at least about 0.5%, by weight, ferrous ions (expressed as Fe) plus sufficient free iron to react with arsenic present. Sufficient free iron is theoretically present if it is available in solution at at least a 1:1 molar ratio for reaction with arsenic present in solution.

While the free iron in solution for reaction with arsenic can be provided by any material(s) which yield ferric and/or ferrous ions in solution, ferrous sulfate conveniently provides the ferrous ions to insure proper setting of the "pug" and free iron in solution to react with arsenic in solution. In fact, at least about 1% ferrous sulfate, preferably at least 2% ferrous sulfate, based on the weight of the spent pickling liquor, will often provide sufficient ferrous ions to insure proper "pug" setting and sufficient free iron to react with the free arsenic in solution derived from many commonly encountered water-soluble arsenic salt-containing waste materials.

The minimum limit of about 1%, most preferably 2%, ferrous sulfate is set based upon a consideration of practical reaction kinetics to permit operation at a commercially feasible rate. The maximum amount of ferrous sulfate is not especially limited—i.e., no harm is encountered with excesses of ferrous sulfate above the solubility limits thereof at the temperature involved—but since ferrous sulfate which precipitates out of solution does not provide ferrous ions for pug setting or reaction with arsenic, nothing is gained by the presence of very high amounts of ferrous sulfate.

At commonly encountered conditions for practicing the process of this invention usually amounts of ferrous sulfate in excess of about 10–12%, even more commonly about 5% (especially when operation is at about 5° C.), are seldom encountered.

It is to be noted that ferrous sulfate is not necessary for the soluble arsenical salt reaction per se of the present invention, and could, for example, be replaced by another ferrous or ferric salt, such as ferric chloride, with the same result insofar as reaction kinetics with the soluble arsenic salts are concerned. However, ferrous ions are necessary to make the "pug" solidify or set up, and, for this reason, ferrous sulfate, which provides a source of ferrous ions in aqueous solution and is inherently present in a spent pickling liquid, is considered the most practical component in the present invention due to its normal occurrence in spent sulfuric acid pickling liquor.

In those instances where a semi-solid final product is acceptable, it would not, of course, be necessary to utilize ferrous sulfate, but this obviates one major advantage of the present invention.

As a practical matter, normal spent pickling liquors as are obtained from conventional steel mill operations do not often contain substantially lesser or greater amounts of sulfuric acid, ferrous sulfate or free iron in solution than those called for above. As will be appreciated by one skilled in the art, since the spent pickling liquor always contains substantial proportions of water, both lesser and greater concentrations of sulfuric acid can be present, but in order to achieve the optimum effects of the present invention wherein spent pickling liquor is used substantially as received from steel operations, the above range is highly preferred.

Other materials, so long as they are not harmful to the reaction, can be present and, in fact, may sometimes often be present, in the spent pickling liquor. Exemplary of such additional constituents as are typically contained in this by-product from steel mill operations include trace heavy metals, such as zinc, chromium, nickle, copper, cadmium or the like, typically being found in the spent sulfuric acid pickling liquor if the same is combined in a steel plant with the off-stream from a processing other than cleaning and descaling of steel. Based on results to date, such trace heavy metals have no impact upon the efficiency or operability of the process of the present invention.

Lime

The third mandatory constituent of the present invention is a source of calcium hydroxide, typically lime which is impure calcium hydroxide and is normally derived from bag house collection systems from the production of calcium oxide or quick lime (another word for calcium oxide), and which is commonly referred to as bag house lime.

As will be appreciated by one skilled in the art, while pure calcium hydroxide can be utilized in the process of the present invention, this will obviate one of the primary benefits of the present invention—i.e., the utilization of common waste materials which, at present, have limited, if any, uses.

A most preferred source of lime for utilization in the process of the present invention, because of low cost and availability as a waste product, is bag house lime. Bag house lime is typically approximately 70–80%, by weight, calcium hydroxide, one active constituent required for the detoxification of organic water-soluble arsenical salts in the process of the present invention.

Other constituents are typically present in bag house lime; but for purposes of the present invention, they can be considered "inert" —that is, they do not enter into the reaction of the present invention to any substantial extent and merely continue through the process of the present invention so as to be present in the final detoxified product without substantial negative or beneficial effect. Typical and representative of such "inert" materials present in a bag house lime which is about 85% calcium hydroxide are, in % by weight of the bag house lime:

Approximately 1% magnetic iron oxide ($Fe_3O_4$);
About 10–12% calcium carbonate;
About 2% insoluble silicates;
Trace heavy metals.

In a bag house lime which contains less calcium hydroxide, usually the above "inert" materials are merely present in greater proportions.

None of the magnetic iron oxide, calcium carbonate, insoluble silicates or trace heavy metals have any substantial impact upon the process of the present invention, for the reasons set forth above. They can be absent from the lime, can be present in greater proportions or, in fact, can be replaced by other materials so long as such other materials do not have a deleterious effect on the process of the present invention. The important parameter is that lime (calcium hydroxide) be present in an amount sufficient to provide the optimum pH for the reaction of the present invention to proceed, and if a material other than pure calcium hydroxide is utilized, it is important that the calcium hydroxide content be a minimum of about 65%, by weight, of the calcium hydroxide-containing material which is utilized in the process of the present invention. This is necessary so that the lime/acid ratio will fall within the process parameters necessary for the "pug" to properly set up, as later explained.

Process Parameters

As will be appreciated by one skilled in the art, the ratios of the spent pickling liquor and lime will depend upon the amount of the arsenic-containing waste material being treated and, more importantly, the amount of water-soluble arsenic salts therein.

Taking a typical and representative arsenic salt-containing waste material—i.e., one which contains on the order of about 1 to about 10% water-soluble arsenic salts, based on the total amount of waste composition—preferred results are obtained in accordance with the present invention if from about 6 to about 8 pounds of such a water-soluble arsenic salt-containing waste material are utilized per gallon of spent pickling liquor, the pickling liquor containing about 8 to about 20% $H_2SO_4$, most preferably 8–12% $H_2SO_4$, based on the weight of the pickling liquor, and containing sufficient ferrous sulfate to insure proper "pug" setting and provide a molar ratio of iron:arsenic of at least 1:1, typically comprising at least about 1%, by weight, ferrous sulfate based upon the weight of the spent sulfuric acid pickling liquor.

Given the above system, about 2 to about 8 pounds of either technical grade lime or, in a preferred embodiment, from about 2 to about 8 pounds of bag house lime (which contains at least 65%, by weight, calcium hydroxide, based upon the total weight of the bag house lime) is utilized per gallon of spent pickling liquor. As will be apparent to one skilled in the art, acid strength and the water-soluble arsenic to acid ratio will dictate lower or higher lime amounts be utilized within the above range.

As one skilled in the art will appreciate, of course, one can theoretically use somewhat lesser amounts of iron; but unless the stoichiometric ratio to water-soluble arsenic is present, there will be incomplete reaction of the water-soluble arsenic present, resulting in elevated water-soluble arsenic present in the final product. This is highly undesirable.

The above ratios regarding the total amount of water-soluble arsenical salts, spent sulfuric acid pickling liquor, acidity thereof and content of ferrous sulfate, in addition to the amount of lime (either technical grade or bag house), are critical in the sense that they relate the arsenical salt content to the acid ratio, and the quantity of arsenical salt present must not exceed the volumetric capability of the sulfuric acid to dissolve the soluble arsenical salts present, and also must not exceed the ferrous sulfate ratio in the spent sulfuric acid pickling liquor which is a primary reactant in the process.

In a similar fashion, the arsenical salt/acid to lime ratio is critical because the lime is necessary to neutralize the acidity of the sulfuric acid and is the primary constituent which causes the waste end product to set up as a "pug" type material which, in turn, makes it operationally suitable for secure landfill disposal.

If the arsenical salt to sulfuric acid ratio is not adhered to—i.e., either too much arsenical salt is utilized or too little sulfuric acid is utilized in the process—this will cause a significant decrease in the reaction of the arsenical salts with the ferrous sulfate, resulting in unreacted arsenical salts remaining soluble.

If the salt/sulfuric acid to lime ratio is not adhered to—i.e., too little lime is added—this results in a sulfuric acid content which is not totally neutralized—i.e., free sulfuric acid remains—and this can cause difficulties in the "pug" material not properly setting up, thereby creating additional operational problems.

If too much lime is added, however, this creates no problems in having deleterious effects in accordance with the present invention, and will only slightly increase the alkalinity of the final product, which will not create any problems in secure landfill disposal operation. This does, however, non-preferably increase the processing costs. Sufficient water is present in the spent pickling liquor (which essentially is $H_2SO_4$, ferrous sulfate and water) so that it is not necessary to add water to the system, though such may be added if desired. Water may or may not be present in the arsenic-containing waste material; if present or not, such will have no substantial impact upon the process of the present invention provided that the addition of water will not, through dilution, bring the acid strength below the process parameters as previously delineated.

Unless purposely added, no moisture of substance will be introduced with the lime—e.g., with the bag house lime dust.

The pressure of the reaction of the present invention is not overly important; but for economic purposes, it is conventionally performed at ambient pressures. While sub- or super-atmospheric pressures could, in theory, be utilized without effecting the kinetics of the reaction of the present invention, at present no benefits of substance are seen which would be gained by operating at sub- or super-atmospheric pressure. In fact, the more complicated equipment necessary to operate at sub- or super-atmospheric pressure decidedly renders such operation non-preferred in the present invention, one primary objective of the present invention being to minimize operational costs in detoxifying arsenic-containing wastes.

The temperature of operation in accordance with the present invention is also substantially non-critical; and, for economic purposes, operation will generally be at ambient conditions. The reaction is not highly exothermic or endothermic, and accordingly, any heat generated or absorbed due to reaction kinetics can be substantially ignored, though a slight temperature rise will be encountered since the reaction is slightly exothermic. Again, while operation at other than ambient temperatures is possible, no substantial benefits are encountered by such operation. Rather, the substantial detriment is encountered that cooling or heating equipment becomes necessary, a substantial expense not mandated by the reaction of the present invention.

It can generally be said that reaction at a temperature of from about 5°–60° C. provides excellent results. One problem which should be noted with operation substantially in excess of about 60° C. is that sometimes organic arsenical compounds can sublime at temperatures in excess of about 100° C., and this could lead to potential air pollution problems which could be undesirable.

Turning to the time of reaction, this can be varied widely in the present invention and is highly flexible. Generally speaking, the minimum time required is, of course, the time required to insure complete reaction of the water-soluble organic salts. With modern mixing equipment, reaction time is substantially instantaneous—i.e., as soon as water-soluble reactants can be dissolved and contacted, reaction proceeds substantially immediately. This means that the waste material, pickle liquor and bag house lime can be efficiently mixed and immediately forwarded to cure, if desired (the order of mixing is not important and mixing can be sequential in any order or simultaneous). The maximum time is essentially set by economic parameters—i.e., one would logically seek to utilize the minimum reaction time to insure substantially complete reaction of the water-soluble arsenic salts to reduce the size of the equipment necessary for the holding times involved.

On a commercial scale reaction is generally easily effected in a period of time of from about 10 seconds to about 5 minutes under the conditions earlier described. Lesser times could be used at somewhat elevated temperatures and/or with high agitation; and greater times could be utilized at somewhat lower temperatures and/or with minimal agitation. A time of from about 10 seconds to about 5 minutes is sufficient for purposes of achieving the objects of the present invention since the nature of the waste materials processed in accordance with the present invention does not require long retention times.

Typical Reaction Sequence

As earlier indicated, the process of the present invention is extremely simple in operation. In a typical process run, arsenic-containing waste, spent pickling liquor and bag house lime are mixed in a reactor provided with a stirrer. Due to the water present, the entire mass is quickly formed into a slurry, whereafter mixing of the slurry proceeds in contact with the atmosphere, thereby permitting oxidation to occur due to contact of the slurry with oxygen in the air, thus causing the slurry to solidify and "set-up" as a pug-type material.

The process of solidifying or "setting" results in what has earlier been described as a "pug"-like material.

This step is optional in the pure theoretical sense of operating the process of the present invention in that the addition of lime is theoretically only required in an amount sufficient to neutralize the acid present from the spent sulfuric acid pickling liquor, and, in theory, it is possible to add only enough lime to bring the pH to 7 (substantially neutral).

However, the above theoretical approach to the process of the present invention would result in the "pug" not setting up or curing properly, and would lead to the ensuing operational problems of moving a semi-solid material to a secure landfill disposal area. While the water-soluble arsenical salts would be converted to their water-insoluble form whether or not the "pug" is set up properly, as a practical matter, a solidifying or "setting" step is conducted in accordance with the present invention, typically at ambient temperature and pressure conditions.

While setting could be conducted at sub- or super-atmospheric pressure, nothing is gained wth such more complex systems in the sense of practical commercial efficiency, and a similar effect is noted with the possibility of operation under cooling or heating conditions—e.g., more complicated equipment is necessary, cooling generally results in a slowing of the "setting" and in a practical commercial sense, any time benefits gained by heating to speed up solidifying or "setting" are more than offset by increased equipment and process costs.

The time of solidifying or "setting" can vary greatly, and at least partially is inversely proportional to the temperature of operation. Typically, however, at conventionally-encountered ambient conditions—that is, typically at about 5° to about 60° C., though somewhat lesser and substantially greater temperatures can be used (noting the sublimation problem earlier alluded to), curing will be effected in about 15 minutes to about 2 hours to provide the solid "pug". Greater curing times can, of course, be used, and no significant problems are encounterd, but, at the same time, no benefits are gained by such increased hold times.

The process of the present invention can be practiced in a batch or in a continuous process, depending upon the necessities of the situation. While economics dictate oxidation proceed in a system open to the atmosphere with a relatively large surface area to permit good liquid/air contact, if process time and/or available area are binding restraints, an oxygen-containing gas, typically air, or oxygen could be bubbled into the reaction system. As will be appreciated, however, this will increase processing costs and, if adequate holding time is permitted, will not be necessary.

During reaction, the system is generally agitated to insure a homogeneous slurry. If desired, the system can also be agitated during the initial stages of curing to promote contact with the air, with agitation typically being halted when the "pug" sets to the stage where mixing becomes difficult. Mixing is not mandatory during curing, however.

Explanation Of Reaction Kinetics

The explanation below is offered with respect to a typical "pug mill" process, a simple acid neutralization system using conventional apparatus.

In a pug mill process, spent pickling liquor which contains substantial proportions of sulfuric acid is neutralized using calcium hydroxide, a known procedure in the steel-processing art.

The reaction within the pug mill can be schematically illustrated as follows:

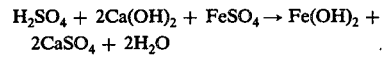

$$H_2SO_4 + 2Ca(OH)_2 + FeSO_4 \rightarrow Fe(OH)_2 + 2CaSO_4 + 2H_2O$$

The ferrous hydroxide formed in the above reaction is oxidized by oxygen in air in the pug mill process to form ferric hydroxide [Fe(OH)$_3$] as illustrated by the reaction schematic below:

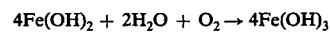

$$4Fe(OH)_2 + 2H_2O + O_2 \rightarrow 4Fe(OH)_3$$

The product from a typical pug mill process contains sulfuric acid which comprises about 10% of the product, and will contain on the order of about 5% Fe$^{++}$ and have a pH between 0.9 and 1.0. Sufficient iron in soluble form is present in the pug mill product to react with the arsenic in the arsenic-containing waste material in the present invention to form iron orthoarsenate (FeAsO$_4$) and iron diarsenide (FeAs$_2$) which are insoluble in water and well suited for secure landfill disposal.

Accordingly, the "pug mill" process above described is easily modified to achieve the process of the present invention by, essentially, mixing the spent pickling liquor and lime as indicated above and, in addition, adding the desired amount of the arsenic-containing material of the present invention, typically a by-product from the production of arsenic-containing herbicidal salts.

Assuming that the arsenic waste composition earlier described is combined with spent pickling liquor and bag house lime as earlier described, the overall reaction of all major chemicals and the arsenic derived from inorganic components can be represented as follows:

$$4As(ONa)_3 + 5FeSO_4 + 4Ca(OH)_2 + 5H_2SO_4 \rightarrow$$
$$FeAs_2 + 2FeAsO_4 + 6Na_2SO_4 + 2Fe(OH)_3 + 4CaSO_4 + 6H_2O$$

The arsenic derived from organic materials in a typical arsenic waste material as above exemplified reacts according to the following two equations:

1. Cacodylic acid:

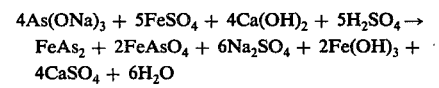
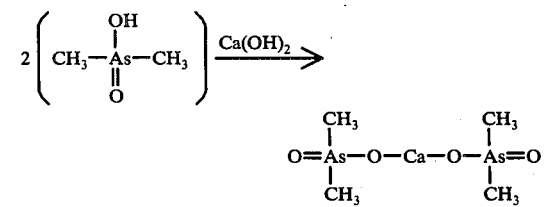

2. Monosodium Methane Arsenate:

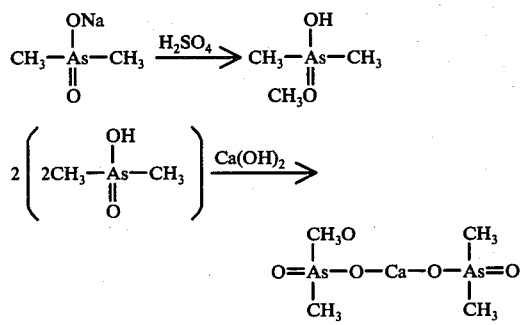

The calcium salt of cacodylic acid is insoluble in water.

Taking the above reaction as representative, in processing for an extended period the above reaction permitted a 99.3–99.7% reduction in soluble arsenic salts, as compared to the starting arsenic waste material.

According to the above process, the final product contains iron diarsenide, iron orthoarsenate (which represent the "treated" form of the most widely used arsenic compounds encountered in industry today), sodium sulfate, calcium sulfate, ferric hydroxide and water. The iron will react with the arsenic present because the arsenic is in anionic form, reacting with the cationic form of iron, thereby resulting in insoluble arsenic compounds.

In the context of the present invention, the term "insoluble" has its common art recognized meaning—i.e., it means that the product arsenic compounds will not dissolve in water or in commonly encountered organic acids, such as acetic, butyric or like acids which quite often occur naturally through biodegradation in landfill environments, quite often resulting in varying pH levels of from about 4 to 11.

It is to be noted that in addition to the water-insoluble arsenic salts mentioned above, several other materials are present. These materials can be considered non-interfering in the present process, and thus are not crucial to the treatment process of the present invention. This is particularly the case since the process of this invention concerns itself with the preparation of a material for secure landfill disposal, and not the obtaining of a material for sale as a product with specific parameters on the components therein.

In addition to the materials mentioned above, other materials which quite often will commonly be encountered in the product of the present invention include calcium hydroxide, the calcium salt of cacodylic acid, hydroxide forms of heavy metals, iron arsenite, iron orthoarsenate, silica and magnetic iron.

The product resulting from the above treatment is solid in form, is easily handled, and can be environmentally disposed of in a secure landfill.

Disposal is in an appropriate manner for landfills, and the resulting product is merely covered with an appropriate amount of clay in a conventional manner to securely encapsulate the insoluble waste.

It is to be specifically noted that in accordance with the present invention if a waste product such as high calcium flue dust is used to supply the lime or neutralizing agent used, such material will contain iron and silicates which apparently aid the reaction of the present invention to provide an easily handled sludge. The sludge is nonleachable, though substantial amounts of $CaSO_4$ are present, and such is soluble to 1800 ppm.

Having thus generally described the invention, the following examples are presented to illustrate currently-preferred modes of practicing the invention. These examples are not, however, to be construed as limitative.

EXAMPLES 1–6

An arsenic-containing waste material and bag house lime are mixed at the ratios given in Table 1 at ambient temperature (about 25° C.) and pressure to form a homogeneous mixture, mixing occurring in a conventional pug mill (both materials were solid in nature).

The bag house lime comprised 85%, by weight, calcium hydroxide, based on the total weight of the bag house lime, balance $Fe_3O_4$, $CaCO_3$, insoluble silicates and trace heavy metals as earlier described. It was a conventionally available waste product.

The arsenic-containing waste material comprised a variable amount of sand, gravel and other debris, all of which were "inert" to the reaction. Other chemicals present, including arsenical and organic values, were as identified in Table 2, with the arsenicals being identified specifically in Table 3 and the organics being identified specifically in Table 4. The only difference between Examples 1–3 and 4–6 was that a greater amount of such other chemicals were present in Examples 1–3 as compared to Examples 4–6 to provide the initial arsenic (water-soluble) values given in Table 1.

After a homogeneous mixture of the arsenic-containing waste material and bag house lime was formed, spent sulfuric acid pickling liquor was then added in the amount shown in Table 1 at ambient temperature and pressure and mixing effected for about 10 seconds to give a homogeneous slurry.

The spent sulfuric acid pickling liquor comprised 10.2%, by weight, sulfuric acid and sufficient ferrous sulfate to provide 4.8%, by weight, $Fe^{++}$, at a pH of 0.90 and 780 mg/l Cl, balance water, all percentages being based on the total weight of the spent sulfuric acid pickling liquor. This was a typical spent sulfuric acid pickling liquor.

Once the arsenic-containing waste material, bag house lime and spent sulfuric acid pickling liquor were sufficiently mixed to provide a homogeneous slurry, the slurry was then permitted to cure for 2 hours by permitting the same to stand at ambient temperature and pressure.

The resulting pug material was slurried and then filtered and brought to 2,000 ml volume with distilled water, whereafter the amount of final arsenic (water-soluble) values were determined, with the results shown in Table 1 being obtained.

The percent reduction in the arsenic (water-soluble) values is also shown in Table 1; in all instances, it is seen that percent reduction approached 100%.

The resulting product was, in all cases, solid and easily handled using conventional solid conveying equipment. It was amendable to disposal in a secure landfill in a conventional manner.

EXAMPLE 7

Although the final product of Examples 1–6 was of an alkaline nature (approximately pH 10.7), further testing was conducted to insure that the ultimate disposal conditions would not potentially create an acidic environment that might tend to alter the leaching characteristics of the set "pug."

Results show that maximum arsenic insolubility occurs over the pH range of about 4.5 to about 7.5, providing increased arsenic fixation as the buffering capacity decreases.

Generally, the landfill environment where the product of the present invention is subjected to secure landfill disposal should be on the order of pH 4.0–10.5, with care being taken that the minimum pH value is not excessively lower than the indicated range.

In this example, 162 grams of an arsenic-containing waste material, substantially as in Example 1, was mixed with 43 grams of bag house lime, an approximately 4:1 ratio of arsenic-containing waste material to lime.

The initial arsenic concentration in the arsenic-containing waste material was 1.2% or 12,000 ppm. The bag house lime was 85%, by weight, calcium hydroxide, as in Examples 1–6.

After mixing the arsenic-containng waste material and the bag house lime at ambient temperature (about 25° C.) and pressure, the resulting mixture was added to 100 ml of spent sulfuric acid pickling liquor comprising 10.8%, by weight, sulfuric acid and having an iron content of 2.6% as $Fe^{++}$ resulting from ferrous sulfate.

The resulting slurry was mixed and stirred for about 10 seconds at ambient temperature and pressure to form a homogeneous slurry, and then merely allowed to sit and cure for ½ hour at ambient temperature and pressure.

Following the above processing, leachate testing was conducted as follows. From the cured "pug," nine 20 gram aliquotes were prepared for leaching. Each 20 gram sample was placed in 150–200 ml of distilled water and the slurry stirred for 24 hours at ambient temperature and pressure.

During the 24 hour stirring period, the pH of each solution was adjusted with glacial acetic acid to duplicate as closely as possible the organic acid conditions created within a landfill. The pH values were as set forth in Table 5.

Following the 24 hour stirring, the mixed slurry aliquotes were filtered through fast No. 2 Whattman filters and brought to a volume of 200 ml using deionized water. Thereafter, approximately 0.5 ml of concentrated nitric acid was added to each sample to assure total solubility of any arsenic present in the leachate.

Samples were than tested on an A/A using the standard graphite furnace test procedure with a deuterium background corrector. The results are also set forth in Table 5.

In addition, testing was also performed to determine what conditions would be required to cause a pH adjustment from the acceptable level of 10.5 in the landfill to an unacceptable level of 3.5 in the landfill. In this testing, glacial acetic acid was used to make all downward pH adjustments on a 20 gram aliquote as above described. The results of the testing are set forth in Table 6.

The amount of 1% acetic acid required for a pH change from 10.5–3.5 was calculated as follows:

$$\frac{12.7 \text{ ml}}{20 \text{ gms}} \times \frac{1000 \text{ gms}}{\text{kg}} \times \frac{1 \text{ kg}}{2.2 \text{ lbs}} \times$$

$$\frac{2105 \text{ lbs}}{\text{yd}} \times \frac{1 \text{ liter}}{1000 \text{ ml}} \times \frac{1 \text{ gal}}{3.785 \text{ l}} =$$

160.5 gallons glacial acetic acid per yard; assuming a 1% concentration of acid, there would be required 16,050 gallons per yard or approximately 321,000 gallons per 20 yard load.

From the above data and computations, it can be concluded that the conditions necessary to produce an undesirable pH state are virtually unobtainable, and, in fact, the presence of typical levels of acidic leachate should actually aid in producing and maintaining the most stable and non-soluble form of the treated water-soluble arsenic salts.

TABLE 1

| Example No. | Initial Arsenic (Water-Soluble) Values | Treatment Chemicals | Final Arsenic (Water-Soluble) Values | % Reduction in Arsenic (Water-Soluble) Values |
|---|---|---|---|---|
| 1 | 12,100 mg/l | 162 gm As-waste + 43 gm lime + 100 ml spent pickling liquor (4:1 ratio) | 24.7 mg/l | 99.79% |
| 2 | 12,100 mg/l | 120.5 gm As-waste + 43 gm lime + 100 ml spent pickling liquor (3:1 ratio) | 22.2 mg/l | 99.81% |
| 3 | 12,100 mg/l | 81.0 gm As-waste + 43 gm lime + 100 ml spent pickling liquor (2:1 ratio) | 21.3 mg/l | 99.82% |
| 4 | 6,850 mg/l | 162.0 gm As-waste + 43 gm lime + 100 ml spent pickling liquor (4:1 ratio) | 16.8 mg/l | 99.75% |
| 5 | 6,850 mg/l | 120.5 gm As-waste + 43 gm lime + 100 ml spent pickling liquor (3:1 ratio) | 16.0 mg/l | 99.76% |
| 6 | 6.850 mg/l | 81.0 gm As-waste + 43 gm lime + 100 ml spent pickling liquor (2:1 ratio) | 15.4 mg/l | 99.77% |

TABLE 2

| Component | Average |
|---|---|
| Sodium Chloride | 43.4% |
| Sodium Sulfate | 39.5 |
| Water | 15.0 |
| Arsenicals and Organics | 2.0 |
| | 100.0% |

TABLE 3

| Arsenicals | Average |
|---|---|
| Monosodium Methane Arsonate (MSMA) | 1.43% |
| Cacodylic Acid | 0.36 |
| Sodium Arsenite | 0.12 |
| Elemental Arsenic Equivalent Of The Above Species | 0.90% |

TABLE 4

| Organics | Average |
|---|---|
| Dimethoxybenzene | .08% |
| Hydroxyanisole | .05 |
| Hydroquinone | .02 |
| Tetraethylene glycol dimethyl ether | .03 |
| Ethylene glycol dimethyl ether | .01 |
| TOTAL ORGANICS | .19% |

TABLE 5

| Aliquote No. | pH | Arsenic in Leachate as As mg/l | Percent Reduction |
|---|---|---|---|
| 1 | 10.5 | 40 | 99.67 |
| 2 | 9.5 | 37 | 99.69 |
| 3 | 8.5 | 35 | 99.71 |
| 4 | 7.5 | 13 | 99.89 |
| 5 | 6.5 | 12 | 99.90 |
| 6 | 5.5 | 2 | 99.998 |
| 7 | 4.5 | 4 | 99.997 |
| 8 | 3.5 | 50 | 99.58 |
| 9 | 3.0 | 82 | 99.32 |

TABLE 6

| Aliquote No. | Original pH | Adjusted pH | ml Glacial Acetic Acid Required | Theoretical gal/yd of 1% Acetic Acid Required |
|---|---|---|---|---|
| 1 | 10.5 | 9.5 | 0.05 | 63 |
| 2 | 9.5 | 8.5 | 0.05 | 63 |
| 3 | 8.5 | 7.5 | 0.1 | 126 |
| 4 | 8.5 | 6.5 | 0.1 | 126 |
| 5 | 6.5 | 5.5 | 0.2 | 252 |
| 6 | 5.5 | 4.5 | 1.0 | 1,260 |
| 7 | 4.5 | 3.5 | 11.2 | 14,112 |

While the invention has been described in detail with reference to specific embodiments thereof, it will be apparent to one skilled in the art that various changes and modifications can be made therein without departing from the spirit and scope thereof.

What is claimed is:

1. A process for converting a waste material containing water-soluble arsenic salts to a waste material containing water-insoluble arsenic salts which comprises mixing an aqueous system comprising said water-soluble arsenic salts, sulfuric acid and calcium hydroxide in the presence of sufficient ferrous ions to ensure proper curing of the aqueous system to solid form, and sufficient iron in the aqueous system, either in ferrous and/or ferric form, to react with arsenic derived from the water-soluble arsenic salts present, whereby the aqueous system is formed into a slurry, the slurry being contacted with an oxygen containing gas to oxidize the slurry due to contact of the slurry with the oxygen, thus causing the entire slurry to cure to solid form.

2. The process of claim 1 wherein said sulfuric acid and ferrous ions are added to the system as a spent sulfuric acid pickling liquor.

3. The process of claim 2 wherein said spent sulfuric acid pickling liquor comprises sulfuric acid and ferrous sulfate dissolved in water.

4. The process of claim 3 wherein said spent sulfuric acid pickling liquor comprises:
from about 8 to about 20%, by weight, $H_2SO_4$;
at least about 0.5%, by weight, ferrous ions; and
iron in at least a 1:1 molar ratio to arsenic present which is derived from said water-soluble arsenic salts.

5. The process of claim 4 wherein ferrous ions are present in at least said 1:1 molar ratio to said arsenic.

6. The process of claim 4 wherein about 6 to about 8 pounds of said arsenic-containing waste material are mixed with about 1 gallon of said spent sulfuric acid pickling liquor and with about 2 to about 8 pounds of lime, said lime comprising at least 65%, by weight, of said calcium hydroxide.

7. The process of claim 6 wherein said lime is bag house lime.

8. The process of claim 6 wherein said arsenic-containing waste material comprises from about 1 to about 10%, by weight, water-soluble arsenic salts.

9. The process of claim 8 wherein said reacting and said cure are at ambient pressure and temperature.

10. The process of claim 4, wherein said spent sulfuric acid pickling liquor comprises from about 8 to about 12%, by weight, $H_2SO_4$.

11. The process of claim 4, wherein said spent sulfuric acid pickling liquor comprises at least 1%, by weight, ferrous ions.

12. The process of claim 4, wherein the aqueous system consists essentially of said water-soluble arsenic salts, said spent sulfuric acid pickling liquor and calcium hydroxide in the form of bag house lime which comprises at least 65%, by weight, of said calcium hydroxide.

13. The process of claim 12, wherein said mixing is conducted at ambient conditions of about 5°-60° C. in air.

14. The process of claim 13, wherein said cure to solid form is also at about 5° to about 60° C. in air.

15. The process of claim 1 which further comprises disposing of said solid form in a secure landfill.

16. The process of claim 1, wherein said water-insoluble arsenic salts comprise organic and inorganic water-insoluble arsenic salts.

17. The process of claim 1, wherein said water-insoluble arsenic salts are organic water-insoluble arsenic salts.

18. The process of claim 1, wherein said mixing is at a temperature of from about 5°-60° C.

19. The process of claim 18, wherein said cure to solid form is at from about 5° to about 60° C.

20. The process of claim 19, wherein said cure to solid form is effected in about 15 minutes to about 2 hours.

* * * * *

UNITED STATES PATENT AND TRADEMARK OFFICE
CERTIFICATE OF CORRECTION

PATENT NO. : 4,118,243

DATED : October 3, 1978

INVENTOR(S) : Mahendra Sandesara

It is certified that error appears in the above-identified patent and that said Letters Patent are hereby corrected as shown below:

Col. 13, line 1, the formula which currently reads:

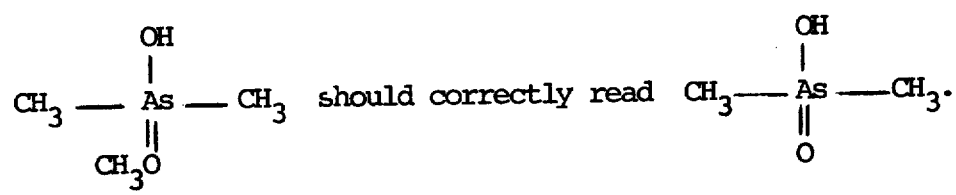

Col. 13, line 2, the formula which currently reads:

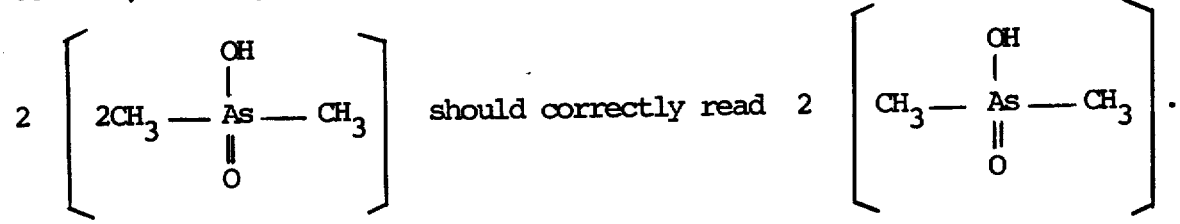

UNITED STATES PATENT AND TRADEMARK OFFICE
CERTIFICATE OF CORRECTION

PATENT NO. : 4,118,243

DATED : October 3, 1978

INVENTOR(S) : Mahendra Sandesara

It is certified that error appears in the above-identified patent and that said Letters Patent are hereby corrected as shown below:

Col. 13, line 3, the formula which currently reads:

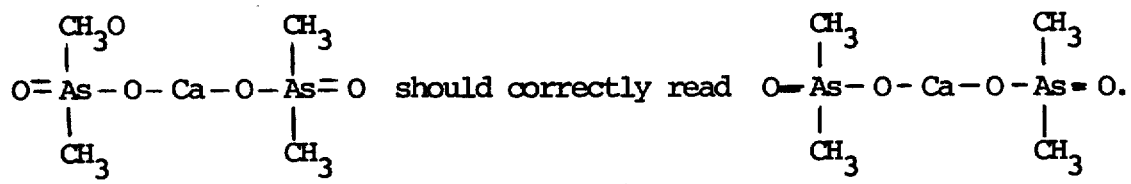

Signed and Sealed this

Twenty-fifth Day of December 1979

[SEAL]

Attest:

SIDNEY A. DIAMOND

Attesting Officer

Commissioner of Patents and Trademarks